United States Patent [19]

Woollenweber

[11] 3,961,867
[45] June 8, 1976

[54] ROTATABLE ASSEMBLY WITH ROTOR ABRADED BY SEAL RING

[75] Inventor: William E. Woollenweber, Columbus, Ind.

[73] Assignee: Holset Engineering Company Limited, Turnbridge, England

[22] Filed: Mar. 27, 1974

[21] Appl. No.: 455,068

[30] Foreign Application Priority Data
Apr. 6, 1973 United Kingdom............... 16521/73

[52] U.S. Cl................................ 417/407; 415/110; 415/170 A; 277/94
[51] Int. Cl.²................... F03B 11/00; F03D 11/00; F16J 15/34
[58] Field of Search.................... 417/407, 408, 409; 415/111, 110, 170 A, 172, 174; 277/94, 83, 178, 81 R; 418/178

[56] References Cited
UNITED STATES PATENTS

| | | | |
|---|---|---|---|
| 1,808,792 | 6/1931 | Schellens | 415/112 |
| 2,980,390 | 4/1961 | Anderson et al. | 277/94 X |
| 3,411,706 | 11/1968 | Woollenweber et al. | 417/407 |
| 3,510,230 | 5/1970 | Raub | 415/170 A |

*Primary Examiner*—Carlton R. Croyle
*Assistant Examiner*—Thomas I. Ross
*Attorney, Agent, or Firm*—Neuman, Williams, Anderson & Olson

[57] ABSTRACT

A rotatable assembly is provided which is adapted to be used in centrifugal compressors, expanders, or the like. The assembly includes a rotor rotatably mounted within a housing. The rotor is provided with an axially extending sleeve portion having an external annular groove and an axially extending bore terminating within the rotor. One end of a rotatably mounted shaft is accommodated within the sleeve bore. A stationary backing plate is disposed within the housing and encompasses the sleeve portion. The plate is provided with a stepped bore through which the sleeve extends. The stepped bore has a large diameter portion and a small diameter portion, the latter being located between the sleeve external groove and the end face of the sleeve. An annular seal means is disposed within the sleeve external groove and sealingly engages the large diameter portion of the plate stepped bore.

4 Claims, 3 Drawing Figures

ROTATABLE ASSEMBLY WITH ROTOR ABRADED BY SEAL RING

BACKGROUND OF THE INVENTION

This invention relates to rotatable assemblies for use in centrifugal compressors or expanders.

Centrifugal compressors have been in widespread use throughout the world for many years, e.g., as in turbochargers on internal combustion engines. One of the problems of compressors is the provision of means for preventing passage of air from the compressor housing to the shaft bearing assembly and preventing passage of oil from the shaft bearing assembly to the compressor housing.

SUMMARY OF THE INVENTION

According to the present invention a rotatable assembly is provided which comprises a rotor located in a housing for rotation relative thereto and mounted on a shaft for rotation therewith. A cylindrical sleeve is formed integral with the rotor and projects therefrom for receiving said shaft. The sleeve has an external annular groove formed therein. A backing plate attached to or forming part of the housing is provided and has a stepped bore formed therein through which the sleeve extends. The large diameter portion of the stepped bore is located closer to the rotor than the small diameter portion. A seal ring is disposed in the annular groove and frictionally engages the large diameter portion of the stepped bore formed in the backing plate. A thrust collar is trapped between a shoulder on the shaft and the end face of the sleeve.

In order to maintain good dynamic balance during operation and prevent the shaft from bending during assembly, the various surfaces which are brought into abutting relationship on assembly of the rotor with the shaft must be parallel and square within close tolerances. The arrangement of the present invention eliminates a separate sleeve used in prior constructions and, thus, substantially reduces the number of surfaces which are required to be square and parallel. A further advantage of the present invention is that the stepped bore arrangement permits lower cost material to be used for the seal ring and enables the sleeve incorporating the ring groove to be formed integrally with the compressor wheel (which is usually made from aluminium), and thereby eliminate a costly separate sleeve with close tolerances and a hardened seal ring groove.

The present invention is applicable to all types of rotating machinery where the rotor is for driving or for being driven by fluids. Examples of such types of rotating machinery are compressors, used in turbo-compressors, and expanders, such as turbine assemblies. In one form of the present invention, a stepped bore and seal ring arrangement is utilized to provide a good seal so as to prevent fluid from escaping from the rotor housing and to prevent oil, etc., from passing into the housing at the point where the shaft passes through the housing.

During operation of the improved rotatable assembly air pressure within the compressor housing acts against a seal ring, disposed between the compressor and turbine housings, and forces same against the side of a groove which is most remote from the rotor disposed within the compressor housing. This causes wear in the sleeve and the seal ring allowing the ring to move axially until it abuts the step in the stepped bore. Further wear is thus inhibited and the wearing-in which has taken place provides a good seal against air leakage from the compressor housing and against oil leakage from the bearing assembly into the compressor housing. The amount of wear desired is predetermined and the step in the stepped bore positioned accordingly.

Although the shaft may extend through the rotor and be affixed thereto by a nut engaging a threaded end portion of the shaft, it is preferred that a threaded portion be provided on the internal surface of the sleeve which engages a threaded portion of the shaft. It is also preferred that the shaft includes an unthreaded end portion which is received in and located by an extension of the bore in the sleeve.

The unthreaded end portion and the bore extension are of reduced diameter compared to the threaded portion of the shaft and the threaded portion of the sleeve, respectively.

When the rotor is attached by a method which does not include the shaft extending through the rotor to engage a nut, the rotor, e.g., a compressor wheel, may be designed to allow for better gas flow. Firstly, the rotor hub profile may be made smaller as compared to when a central hole extends through the rotor hub, because in the latter case the hub must be of large diameter to provide sufficient strength to withstand stresses caused by high rotational speed. Thus, in the improved rotor greater flow area for gas is provided and thus increased capacity is attained for a given rotor size. Secondly, elimination of the locknut removes disturbance to gas flow and allows the front face of the rotor, e.g., the compressor wheel, to be smoothly contoured to provide a smoother gas flow path thereby increasing the rotor efficiency.

A further advantage, which stems from the arrangement whereby the shaft threadedly engages with the integral sleeve, is that the number of surfaces which must be parallel and square is further reduced.

The invention is particularly applicable to the compressor assembly of a turbo-compressor and this invention, therefore, also provides a turbo-compressor assembly in which the compressor assembly is a rotatable assembly of this invention.

Alternatively or in addition, the turbine assembly of a turbo-compressor may also be a rotatable assembly of the invention.

DESCRIPTION

The invention will now be further described by way of example with reference to the accompanying drawings, in which.

Figure 1:
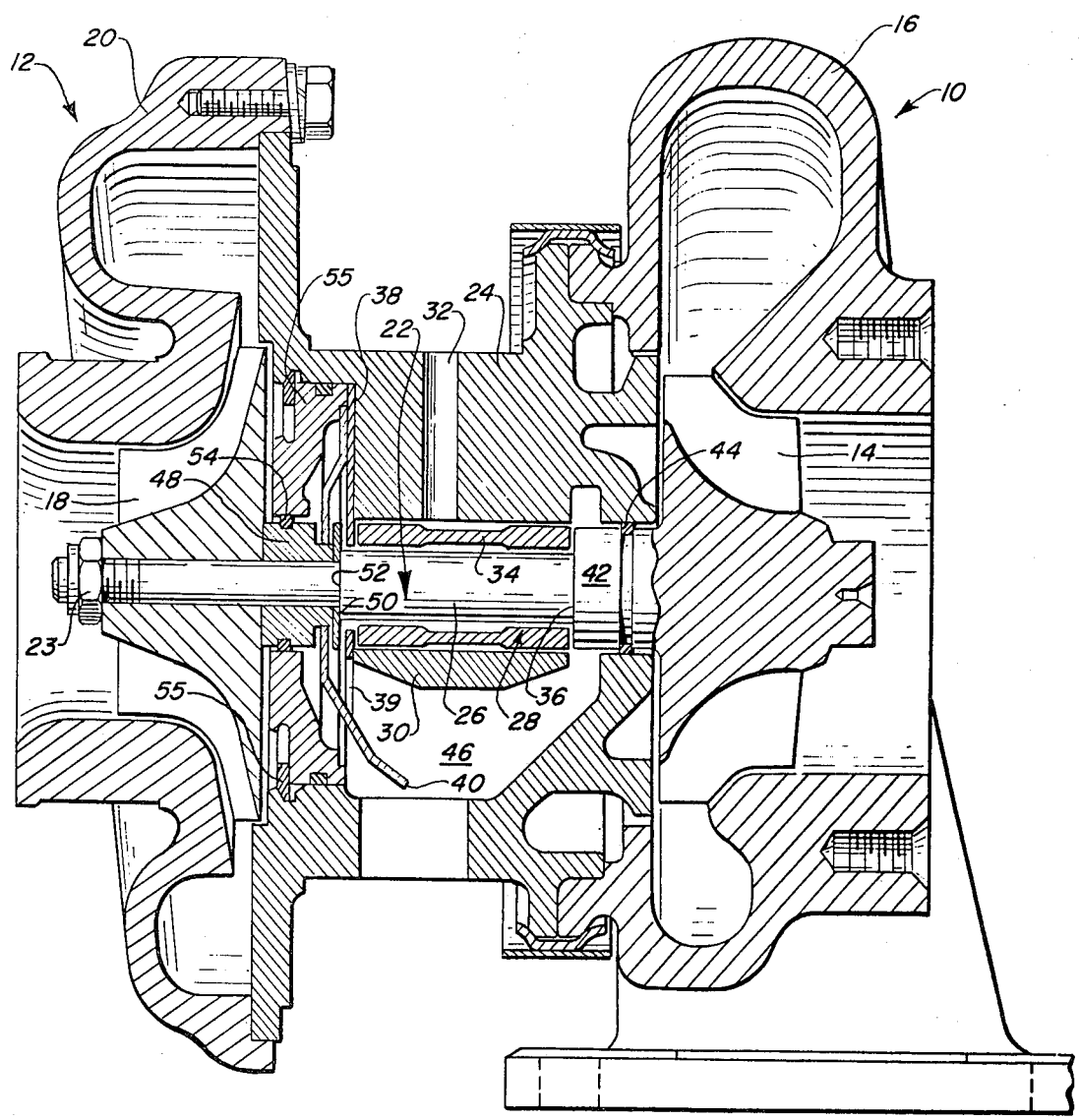
FIG. 1 is a sectional view of a prior art turbo-compressor.

Referring to FIG. 1, the bearing assembly shown is of a type currently in use and is substantially in accordance with that disclosed in U.S. Pat. No. 3,390,926.

The turbocharger shown is of a common type and comprises a turbine assembly indicated generally at 10 and a compressor assembly indicated generally at 12. The turbine assembly 10 includes a turbine wheel 14 and a turbine housing 16, and the compressor assembly 12 includes a metallic (e.g., aluminium) compressor wheel 18 and a compressor housing 20. In accordance with normal practice, the turbine wheel 14 and the compressor wheel 18 are mounted on a common shaft 22. The shaft 22 is fused at one end to the turbine wheel 14 and the other end of the shaft 22 extends through the compressor wheel 18 and threadedly engages a nut 23 to attach the compressor wheel 18 to the shaft 22. The turbine housing 16 and the compressor housing 20 are linked by a housing member 24 which houses the shaft 22. A portion 26 of the shaft 22 is encircled by a full sleeve tubular bearing 28 rotatably located in a sleeve section 30 of the housing member 24. The housing member 24 is provided with a lubricating oil passage 32 which extends into communication with a central depressed portion 34 of the tubular bearing 28 and provides a means for introducing lubricating oil under pressure (e.g., from the lubrication system of an internal combustion engine where the turbocharger is being used for engine supercharging) into the bearing. A shoulder 36 is formed on the shaft 22. A thrust plate 38 including a cut-away portion 39 is secured to the housing member 24 together with an oil deflector plate 40. The lower portion of the thrust plate 38 is bevelled to engage the adjacent portion of the deflector plate 40. The surface of the thrust plate 38, adjacent the bearing 28, provides a thrust surface for the bearing 28. An enlarged portion 42 of the shaft 22 accommodates a cast iron sealing ring 44 which excludes oil and prevents it from migrating into the turbine blade area from the chamber 46 into which oil from the bearing drains. At the compressor end of the shaft 22 a spacer sleeve 48 is locked onto the shaft trapping thrust collar 50 against shoulder 52 on the shaft 22. A cast iron sealing ring 54 cooperates with the spacer sleeve 48 and compressor housing backing plate 55 to seal the compressor area from the bearing lubrication area.

In operation, the turbine assembly 10 is driven by a supply of gas having a high degree of energy (e.g., exhaust gas being emitted from an internal combustion engine). The turbine assembly in turn drives the compressor assembly which draws in a supply of gas (e.g., air), compresses it and delivers it to an internal combustion engine for supercharging purposes. The shaft 22 is thus rotating at high speeds. When the thrust load is acting in a direction toward the turbine assembly 10, the thrust collar 50 bears against the stationary thrust plate 38. Thus, a high relative speed exists between the contacting surfaces of these two parts. When the thrust load acts in the opposite direction (i.e., toward the compressor assembly 12), the tubular bearing 28 carries the thrust load from the shaft shoulder 36 to the back surface of the stationary thrust plate 38. In this case, there is a reduced relative speed between the shaft 22 and the thrust surface due to the rotation of the tubular bearing. The thrust bearing losses in this case are reduced.

To lubricate the system, oil is fed under pressure to oil passage 32 which diverts the oil to the central depressed portion 34 of the bearing 28.

In order to achieve good dynamic balance during operation and to prevent the shaft 22 from being bent out of line when the nut 23 is tightened, the interfaces between the nut 23 and the compressor wheel 18, between the compressor wheel 18 and the sleeve 48, between the sleeve 48 and the thrust collar 50, and between the thrust collar 50 and the shoulder 52 must be parallel and square within close tolerances. It is thus clear in this arrangement that eight surfaces are required to be parallel and square.

Figure 2:
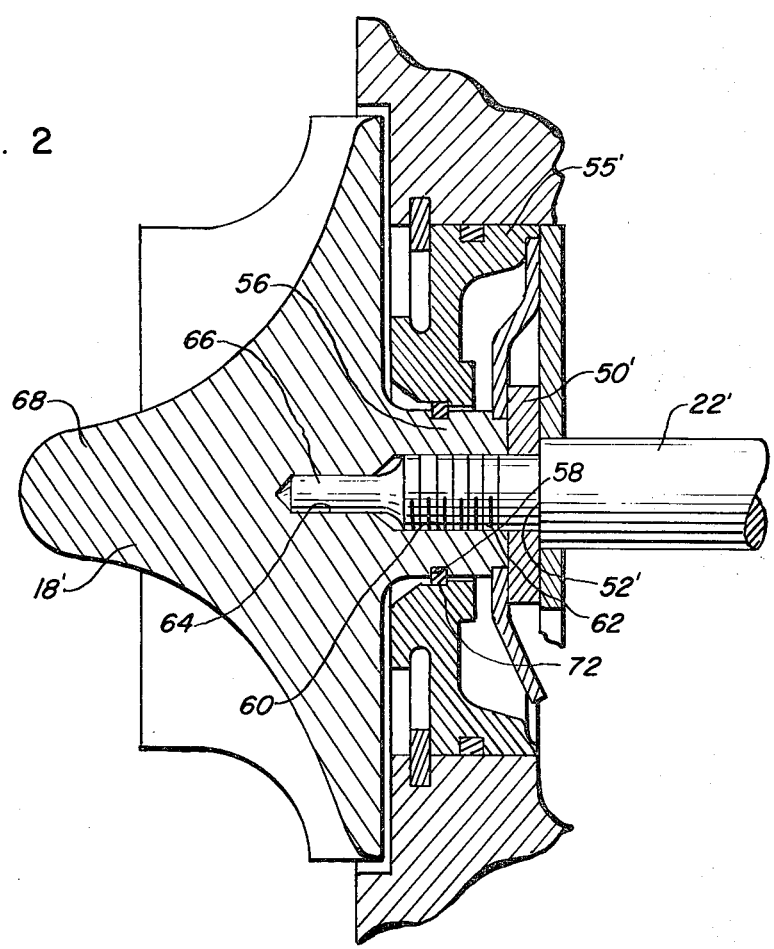
FIG. 2 is a sectional view of part of a turbo-compressor incorporating the present invention.

Referring now to FIG. 2, there is shown part of a turbo-compressor incorporating the present invention. The parts of the turbo-compressor, which are omitted from FIG. 2, may be identical with the turbo-compressor of FIG. 1. In the arrangement of FIG. 2, the compressor wheel 18' includes an integral sleeve 56 having an annular groove 58 around its outer cylindrical surface. Bore 60 of the sleeve 56 is threaded and receives a threaded portion 62 of the shaft 22'. The bore 60 is continued part way into the compressor wheel 18' as a reduced diameter portion 64. A reduced diameter end portion 66 on the shaft 22' is located in this reduced diameter bore 64 providing positive location of the shaft 22' and the compressor wheel 18' during assembly and subsequently. A thrust collar or ring 50'0 is located against shoulder 52' formed on the shaft 22', as in the arrangement shown in FIG. 1. Since the shaft 22' is not attached to the compressor wheel by a nut as shown in FIG. 1, it is possible for the compressor wheel 18' to be shaped at 68 to allow better air flow. Compressor housing backing plate 55' is similar to the part 55 shown in FIG. 1, but includes a bore which is stepped at 70. A seal ring 72 is located in the annular groove 58 and is a friction fit with the larger diameter section 74 of the stepped bore of the backing late 55'.

Figure 3:
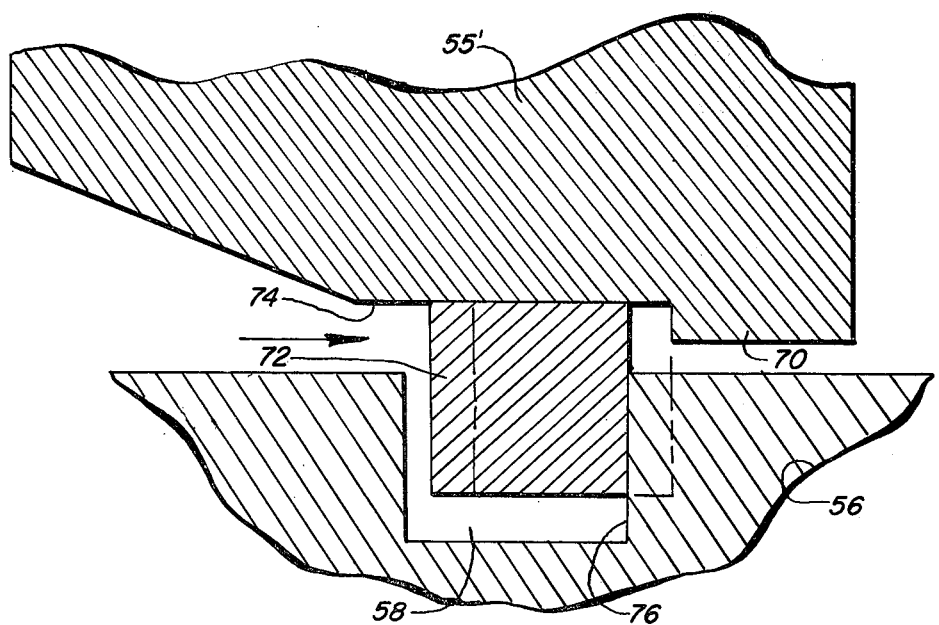
FIG. 3 is an enlarged fragmentary sectional view of a portion of the compressor housing backing plate and a sleeve portion of the compressor wheel, shown in FIG. 2.

In the operation of the device shown in FIG. 2, air pressure acting in the direction of the arrow, shown in FIG. 3, forces the ring 72 against the face 76 of the groove 58 and both the ring 72 and the face 76 wear until the ring 72 abuts the step 70 in the bore of the plate 55'. The desired amount of wear is precalculated and the stepped portion 70 positioned accordingly. When the predetermined amount of wear has taken place (resulting in the ring arriving at the position shown by phantom lines in FIG. 3), the ring 72 forms a good seal to prevent air leakage from the compressor housing and oil leakage from the center housing.

The arrangement of FIGS. 2 and 3 permits lower cost material to be used in the seal ring, permits the ring groove to be placed in the compressor wheel member and, thus, allows the separate sleeve 48 of the arrangement of FIG. 1 to be eliminated. Furthermore, by eliminating the separate sleeve 48 and the nut 23, the number of surfaces which must be parallel and square within close tolerances is reduced from eight to four.

Although the invention has been specifically described with reference to the compressor or assembly of a turbo-compressor, it will be clear that this invention is equally applicable to many other tpes of rotatable assemblies, e.g., expanders, etc.

I claim:

1. A high speed rotatable assembly comprising a housing; a rotor rotatably mounted within said housing, said rotor having an axially extending sleeve portion provided with an axial bore and an external groove; a shaft rotatably mounted within said housing and having one end thereof disposed within said sleeve bore; a backing plate attached to the housing interior surface, said plate being provided with a stepped bore through which said rotor sleeve portion extends, said stepped bore having a large diameter portion and a small diameter portion, the latter forming a step located intermediate the sleeve external groove and the open end of the sleeve bore; seal means disposed within said sleeve external groove and encompassing said sleeve exterior and frictionally engaging the large diameter portion of said plate stepped bore, said seal means having greater wear-resistant characteristics than that of the sleeve portion defining said external groove accommodating said seal means, said seal means having one end face thereof subjected to pneumatic forces urging said seal means towards said step when said rotor is rotating; and thrust bearing means disposed intermediate said sleeve portion and an abutment on said shaft.

2. The rotatable assembly of claim 1 wherein the shaft one end terminates within the sleeve and threadably engages the sleeve axial bore.

3. The rotatable assembly of claim 2 wherein the sleeve axial bore has an internally threaded first portion and a second portion of reduced diameter; said first portion being disposed between said second portion and the open end of said sleeve bore.

4. The rotatable assembly of claim 1 wherein said seal means upon rotation of said rotor has a second end face thereof in sliding engagement with one side of said external sleeve groove until said second end face engages said bore step.

* * * * *

UNITED STATES PATENT OFFICE
CERTIFICATE OF CORRECTION

PATENT NO. : 3,961,867

DATED : June 8, 1976

INVENTOR(S) : William E. Woollenweber

It is certified that error appears in the above-identified patent and that said Letters Patent are hereby corrected as shown below:

Column 4, line 15, "50'0" should be --50'--

Column 4, line 49, "tpes" should be --types--

Column 6, line 2 (Claim 3), after "bore" insert --terminates within the sleeve and--

Signed and Sealed this

Fifth Day of October 1976

[SEAL]

Attest:

RUTH C. MASON
Attesting Officer

C. MARSHALL DANN
Commissioner of Patents and Trademarks